US006741291B1

United States Patent
Tsubaki (10) Patent No.: US 6,741,291 B1
(45) Date of Patent: May 25, 2004

(54) SYNCHRONOUS SIGNAL DETECTION WITH NOISE REJECTION

(75) Inventor: Masahiro Tsubaki, Miyagi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/328,005

(22) Filed: Jun. 8, 1999

(30) Foreign Application Priority Data

Jun. 9, 1998 (JP) .......................................... 10-176737

(51) Int. Cl.[7] .............................. H04N 5/08; H04N 5/10
(52) U.S. Cl. ........................ 348/533; 348/531; 348/540
(58) Field of Search ................................ 348/525, 530, 348/531, 533, 535, 536, 540, 541, 542, 543, 544, 545; H04N 5/08, 5/10

(56) References Cited

U.S. PATENT DOCUMENTS

| 3,671,669 A | * | 6/1972 | Abbott ......................... 348/530 |
| 5,132,794 A | * | 7/1992 | Okada et al. ................. 348/525 |
| 5,245,431 A | * | 9/1993 | Okada et al. ................. 348/531 |
| 5,272,532 A | * | 12/1993 | Akiba .......................... 348/533 |
| 5,309,236 A | * | 5/1994 | Park ............................. 348/500 |
| 5,539,343 A | * | 7/1996 | Yamashita et al. ........... 327/142 |
| 5,608,462 A | * | 3/1997 | Maas et al. .................. 327/141 |
| 5,844,622 A | * | 12/1998 | Hulvey ........................ 348/516 |
| 5,953,071 A | * | 9/1999 | Van Zon ....................... 331/17 |
| 6,028,642 A | * | 2/2000 | Rinaldi et al. ............... 348/531 |
| 6,037,994 A | * | 3/2000 | Bae .............................. 345/213 |
| 6,097,440 A | * | 8/2000 | Omori et al. ................. 348/542 |
| 6,100,935 A | * | 8/2000 | Inoue ........................... 348/521 |
| 6,219,106 B1 | * | 4/2001 | Sato ............................ 348/523 |
| 6,275,264 B1 | * | 8/2001 | Kim ............................. 348/194 |

* cited by examiner

*Primary Examiner*—John Miller
*Assistant Examiner*—Brian Yenke
(74) *Attorney, Agent, or Firm*—Sughrue Mion, PLLC (57) ABSTRACT

A synchronous signal separation circuit 2 for separating horizontal synchronous signal HSn is connected to a horizontal synchronous signal detection circuit 3, which includes a switch 4, an oscillator 5 and a window signal generator 6 for generating a window signal WP. The switch 4 passes the separated horizontal synchronous signal HSn during an open-period of the window signal WP and intercepts the separated horizontal synchronous signal HSn during a close-period of the window signal. The oscillator 5 generates a rate signal having a period equal to a horizontal scan period synchronously with a change in an output signal HS from the switch circuit, and adjusts a time duration of the open period of the window signal so as to make a timing of a change in the output signal HS coincide with a generation timing of the rate signal while the open-period of the window signal is synchronized with the generation timing of the rate signal. With this adjustment of the time duration of the open-period, the correct horizontal synchronous signal HS in the separated horizontal synchronous signal HSn can be detected highly precisely via the switch circuit.

22 Claims, 7 Drawing Sheets

SYNCHRONOUS SIGNAL DETECTION WITH NOISE REJECTION

This application is based on Japanese patent application HEI 10-176737 filed on Jun. 9, 1998, the whole contents of which are incorporated herein by reference.

BACKGROUND OF THE INVENTION a) Field of the Invention

The present invention relates to a synchronous signal detection circuit for detecting a synchronous signal from a video signal.

b) Description of the Related Art

A conventional horizontal synchronous signal detection circuit uses a phase-locked loop (PLL) circuit in order to detect a horizontal synchronous signal from a video signal (composite image signal). A horizontal synchronous signal detection circuit which processes an analog video signal uses an analog PLL circuit, and a horizontal synchronous signal detection circuit which processes a digital video signal uses a digital PLL circuit.

Figure 5:
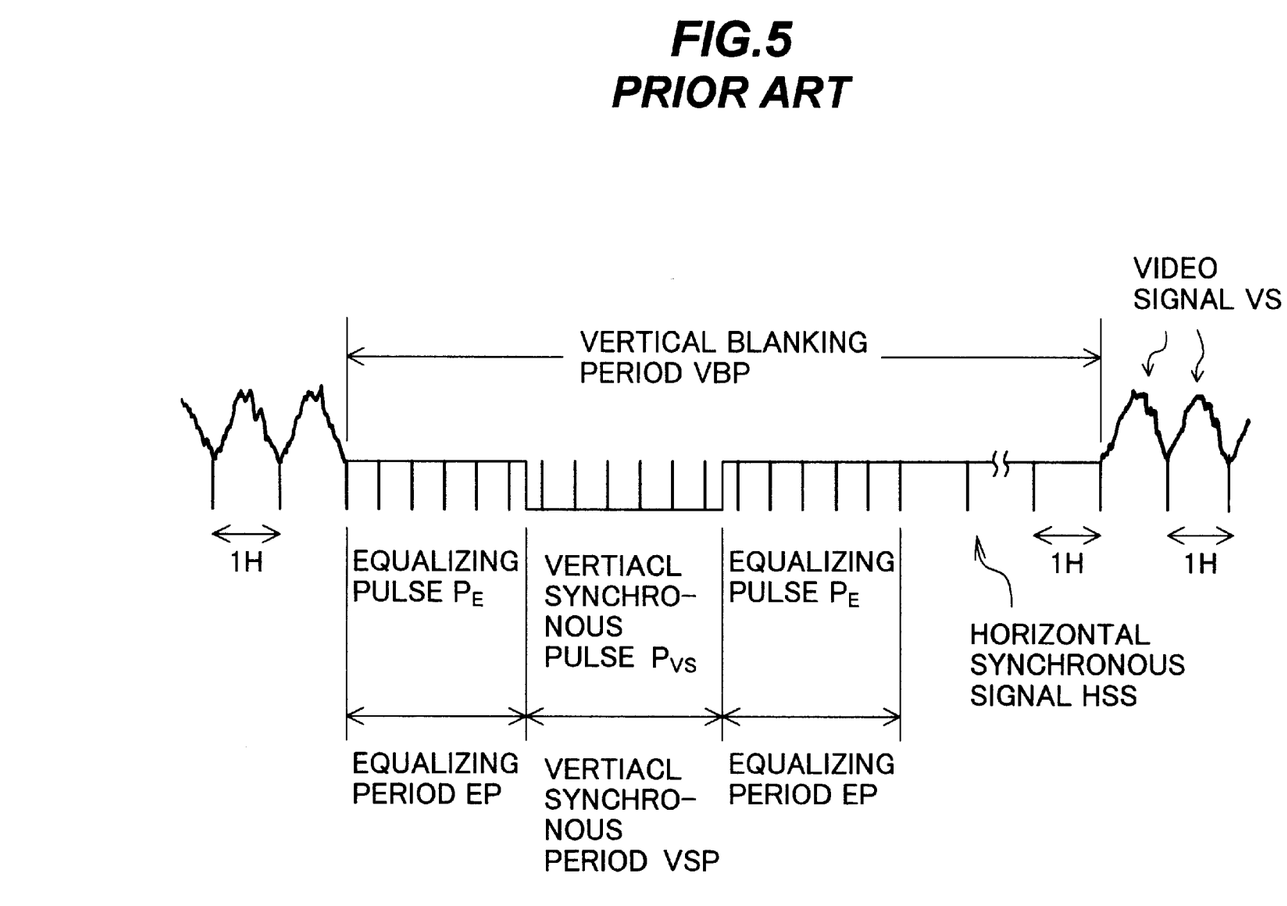
FIG. 5 is a chart schematically showing the waveforms of a video signal.

FIG. 5 is a chart showing waveforms illustrating detection of a horizontal synchronous signal. Synchronization detection is executed by using horizontal synchronous signals HSS and equalizing pulses EP during the vertical blanking period VBP and horizontal synchronous signals during the horizontal blanking period.

Figure 6:
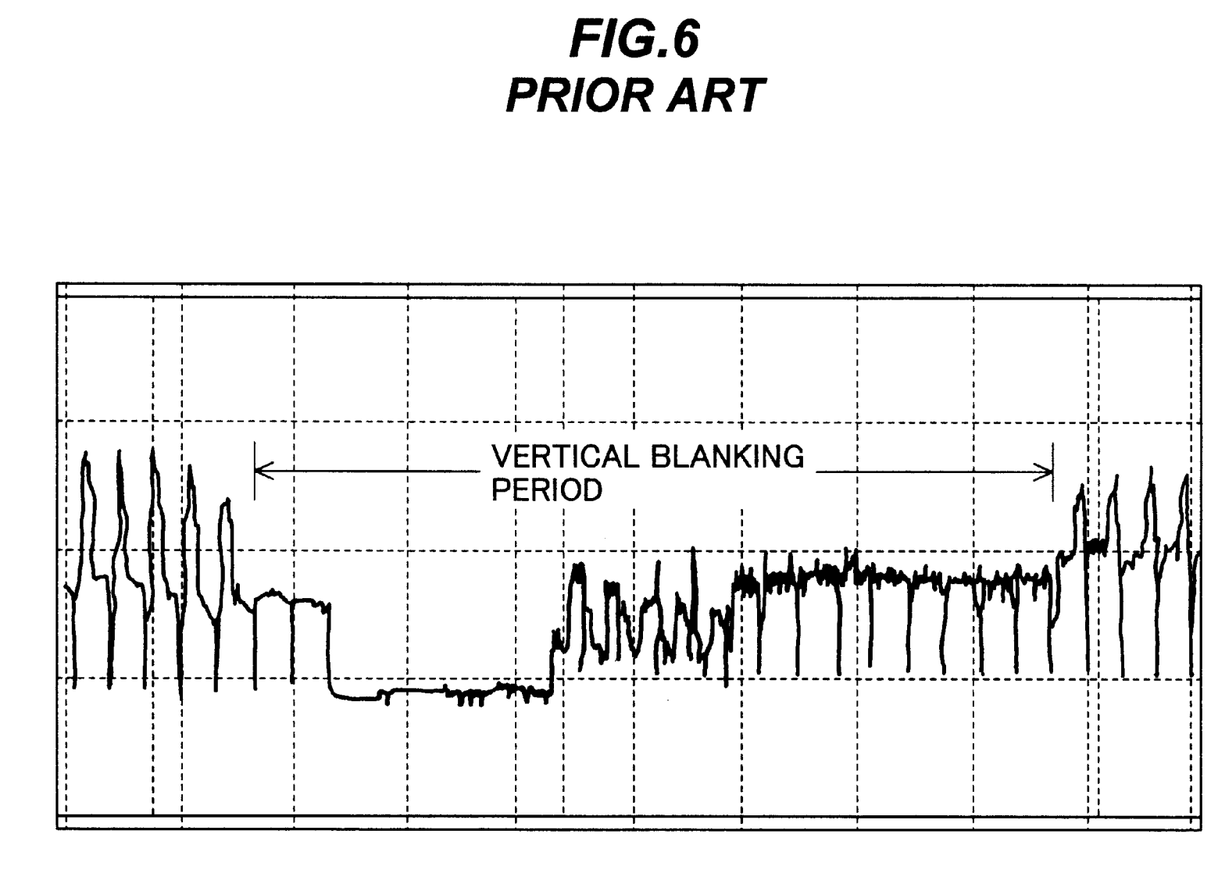
FIG. 6 is a chart showing specific waveforms of a reception signal.

FIG. 6 shows more specific waveforms of a reception signal. Waveform distortion such as corrupted waveforms appears on the horizontal synchronous signals and equalizing pulses during the vertical blanking period.

In order to detect a horizontal synchronous signal without being influenced by such waveform distortion, an analog PLL circuit having a large time constant is used to suppress the waveform distortion.

An analog PLL circuit having a large time constant requires a capacitor having a large capacitance, resulting in a bulky circuit. An analog PLL circuit is susceptible to a variation in component characteristics similar to a general analog circuit, resulting in a degraded manufacture yield, an increase in the number of inspection steps, and a high cost.

A digital PLL circuit does not use horizontal synchronous signals and equalizes pulses having a large waveform distortion during the vertical blanking period by masking them, in order to detect synchronization. Although a horizontal synchronous signal detection circuit using a digital PLL circuit is inexpensive, its operation is not stable.

In a conventional digital PLL circuit, masking and synchronization detection are performed based upon whether there is waveform distortion in horizontal synchronous signals and equalizing pulses during the vertical blanking period. However, if the horizontal synchronous signals inserted in the image signal during the horizontal blanking period have waveform distortion, the masking cannot be executed The reason why the masking cannot be executed for the horizontal synchronous signals in an image signal during the horizontal blanking period results from the principle of PLL. From the principle of PLL, masking is impossible during the horizontal blanking period.

If the horizontal synchronization fluctuates in the image signal, the digital PLL circuit is locked into (synchronized with) this fluctuation. Until the next vertical blanking period, horizontal synchronization with high precision is impossible and the operation becomes unstable.

A horizontal synchronous signal detected by a digital PLL circuit is divided in frequency by this circuit to generate sampling clocks of an image signal. In order to generate the sampling clocks, the digital PLL is required to be operated from a timing several H periods (H is one horizontal scan period) before the end of the horizontal blanking period. However, if horizontal synchronous signals and equalizing pulses during these several H periods have waveform distortion, a PLL lock is delayed so that correct sampling clocks cannot be generated before the horizontal blanking period is terminated. As a result, an image reproduced on a display may be distorted or a portion of a reproduced image is lost.

SUMMARY OF THE INVENTION

It is an object of the present invention to provide synchronous signal detecting techniques capable of masking incorrect synchronous signals.

According to one aspect of the present invention, there is provided a synchronous signal detection circuit comprising:a synchronous signal separation circuit for separating a synchronous signal from a video signal; a circuit for generating a window signal in accordance with the separated synchronous signal, the window signal designating a period during which following synchronous signals are anticipated; and a gate for passing the synchronous signal only during the period designated by the window signal.

According to another aspect of the present invention, there is provided a horizontal synchronous signal detection circuit for detecting a horizontal synchronous signal from a separated horizontal synchronous signal obtained through synchronous signal separation of a video signal, the circuit comprising:a window signal generator circuit for generating a window signal having an open-period and a close-period;a switch circuit for passing the separated horizontal synchronous signal during the open-period of the window signal and intercepting the separated horizontal synchronous signal during the close-period of the window signal; and an oscillator for generating a rate signal having a period equal to a horizontal scan period synchronously with a change in an output signal from the switch circuit, and adjusting a time duration of the open period of the window signal so as to make a timing of a change in the output signal coincide with a generation timing of the rate signal while the open-period of the window signal is synchronized with the generation timing of the rate signal, wherein the output signal is used as a horizontal synchronous signal.

The rate signal is generated synchronously with a change in an output signal from the switch circuit. The open-period of the window signal is set synchronously with the generation timing of the rate signal having a period equal to a horizontal scan period. The time duration of the open-period is adjusted so as to make the timing of a change in the output signal coincide with the generation timing of the rate signal. The correct horizontal synchronous signal in the separated horizontal synchronous signal is output from the switch circuit. This output signal is used as the horizontal synchronous signal so that the horizontal synchronous signal can be detected at high precision.

As above, the rate signal having the period equal to the horizontal scan period is generated, and horizontal synchronous signal detection is executed during the open-period of the window signal synchronizing with the generation timing of the rate signal. The rate signal is generated synchronously with a change in the signal output from the switch circuit during the open-period. The time duration of the open-period of the window signal is adjusted so as to make the timing of a change in the output signal coincide with the generation timing of the rate signal. It is possible to detect the correct horizontal synchronous signal during the open-period of the window signal. Even if noises generated by waveform distortion enter the horizontal synchronous signal, the horizontal synchronous signal detection can be executed quickly if a correct horizontal synchronous signal is generated after the noises disappear.

DETAILED DESCRIPTION OF THE PREFERRED EMBODIMENTS

With reference to FIGS. 1 to 4, an embodiment of the invention will be described.

Figure 1:
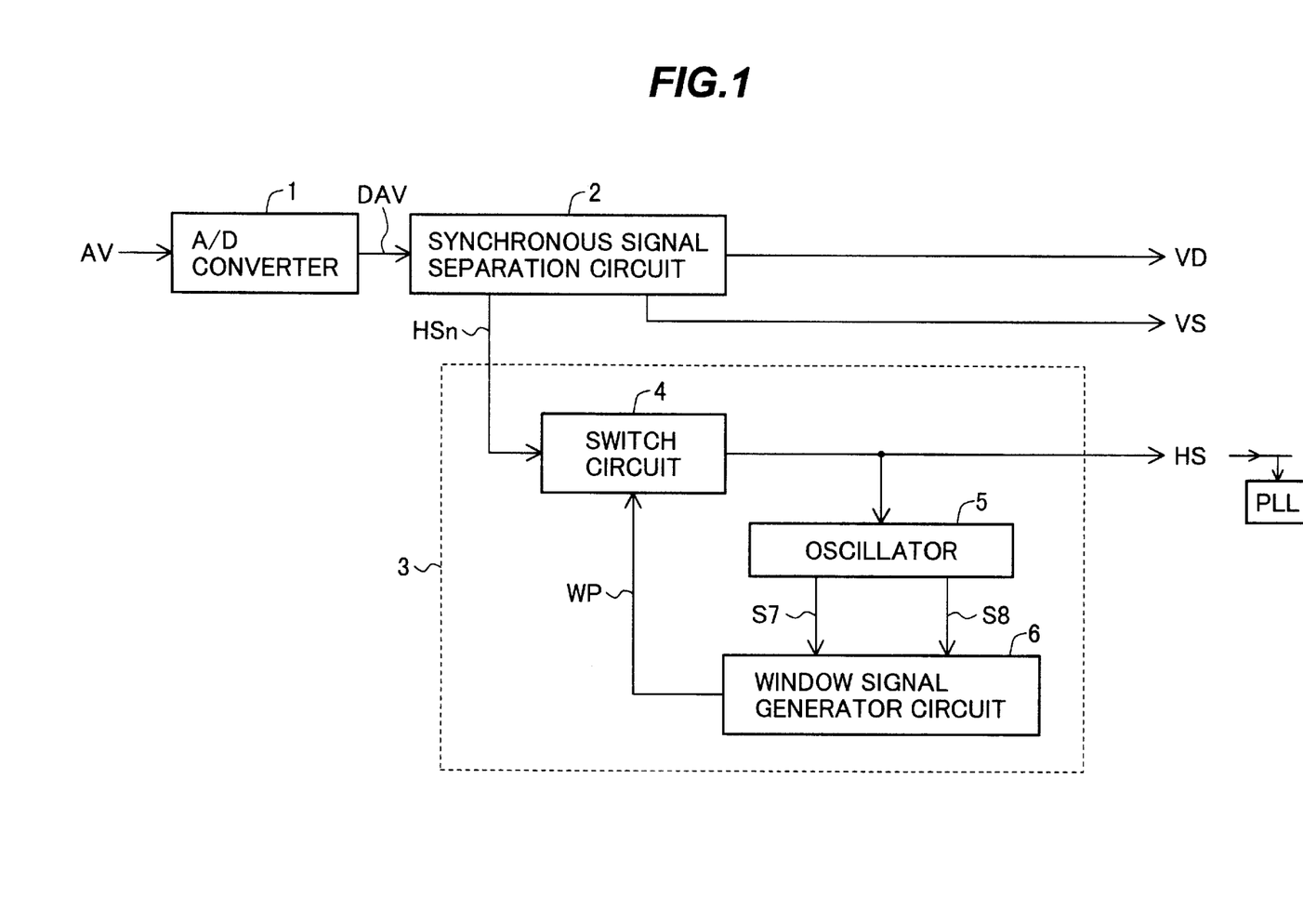
FIG. 1 is a block diagram showing the structure of a horizontal synchronous signal detecting circuit according to an embodiment of the invention.

As shown in FIG. 1, a digital video decoder includes an A/D converter, a synchronous signal separation circuit 2, and a synchronous signal detection circuit 3. The A/D converter 1 converts an analog video signal (composite image signal) AV into digital video data DAV. The synchronous signal separation circuit 2 separates the digital video data DAV into synchronous signals and audio/video signals by utilizing a difference in amplitude, and separates the synchronous signals into horizontal and vertical synchronous signals by utilizing a difference in frequency. In this way, vertical synchronous signals VS and horizontal synchronous signals HSn (hereinafter called a separated horizontal synchronous signal) are acquired.

The horizontal synchronous signal detection circuit 3 includes a switch circuit 4, an oscillator 5, and a window signal generator circuit 6. The horizontal synchronous signal detection circuit 3 generates a more correct modified horizontal synchronous signal HS, by using the separated horizontal synchronous signal HSn generated by the synchronous signal separation circuit 2.

If an analog video signal AV having waveform distortion is supplied, the synchronous signal separation circuit 2 separates horizontal synchronous signals HSn whose synchronization is disturbed by the waveform distortion. The horizontal synchronous signal detection circuit 3 generates more correct modified horizontal synchronous signals HS.

The structures of the switch circuit 4 and oscillator 5 will be detailed with reference to FIGS. 2A and 2B.

Figure 2A:
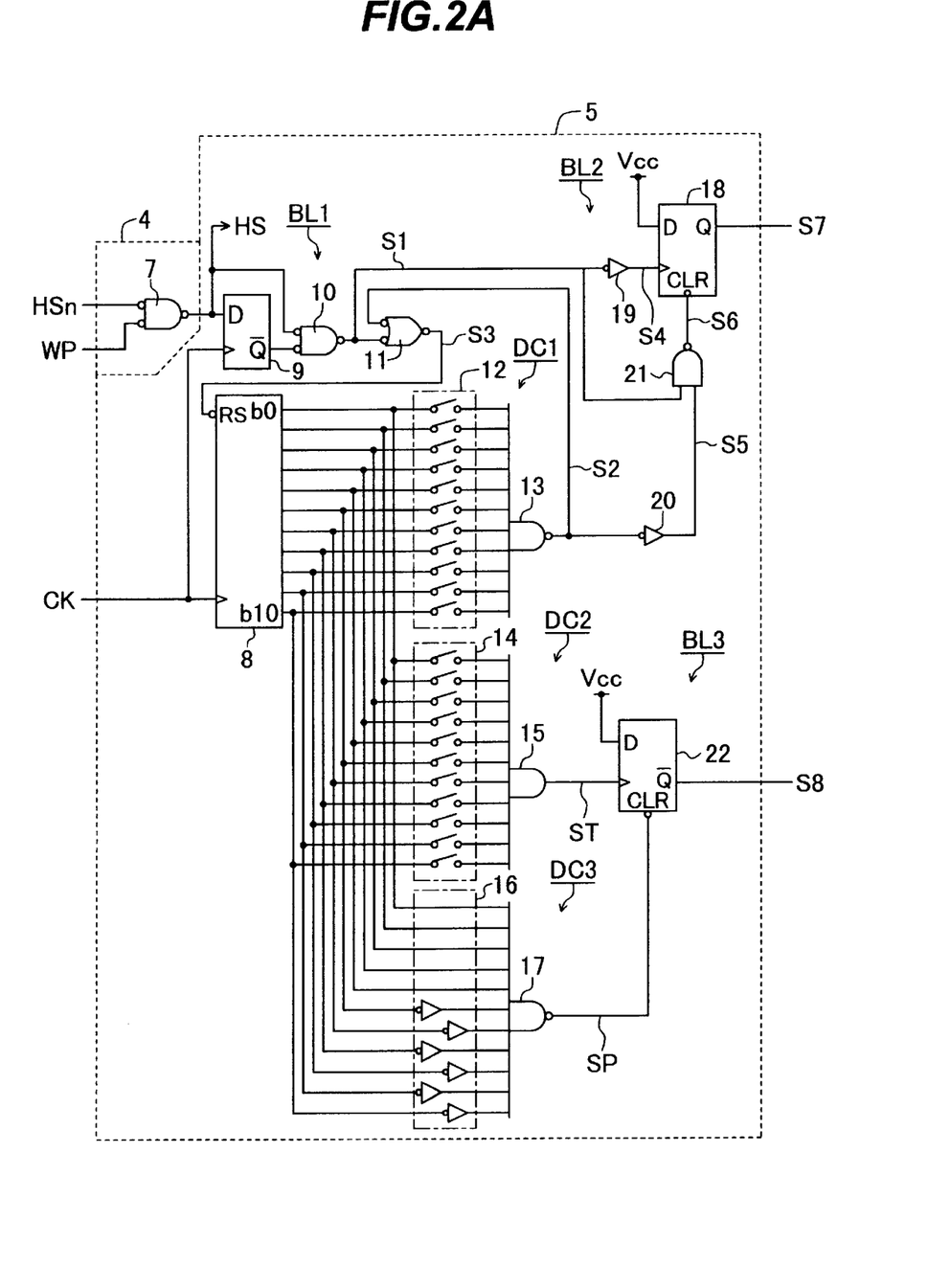
FIGS. 2A and 2B are circuit diagrams showing the structure of a switch circuit and an oscillator in the circuit shown in FIG. 1.

FIG. 2A shows an example of the structure of the switch circuit 4 and oscillator 5. The switch circuit 4 has an AND gate having a NOT gate at each input and output (hereinafter called an OR gate) 7. The OR gate 7 is input with a separated horizontal synchronous signal HSn detected with the synchronous signal separation circuit 2 and a window signal WP generated by the window signal generator circuit 6. The OR gate 7 outputs a signal level "L" only when the two inputs both take "L", and operates on the basis of negative logic. During the period while the window signal WP takes a logical level "H", an output of the OR gate 7 is always "H" and the OR gate 7 takes a non-conductive (close) state to intercept a pass of the separated horizontal synchronous signal HSn. During the open period while the window signal WP takes a logical level "L", the OR gate 7 outputs a signal level "L" or "H" if the separated horizontal synchronous signal HSn takes "L" or "H". Therefore, the OR gate 7 takes a conductive (open) state relative to the separated horizontal synchronous signal HSn to allow the signal HSn to pass therethrough. This separated horizontal synchronous signal HSn during this conductive state is output as the horizontal synchronous signal HS.

The oscillator 5 includes a binary counter 8, first to third signal generator circuits BL1 to BL3, and first to third decoder circuits DC1 to DC3.

The first signal generator circuit BL1 is constituted of a D-type flip-flop (hereinafter called a DFF) 9, an AND gate 10 with a NOT gate at each input and output (hereinafter called an OR gate 10), and an OR gate 11 with a NOT gate at each input and output (hereinafter called an AND gate 11). DFF 9 and OR gate 10 detect a falling edge of the horizontal synchronous signal HS output from the OR gate 7, synchronously with a system clock CK having a narrow pulse width, and generates a detection signal S1 of a single pulse. The AND data 11 is input with the detection signal S1 and a rate signal S2 supplied from a NAND gate 13 to be described later, and supplies a logical sum signal S3 thereof to a reset start terminal RS of a binary counter 8.

The binary counter 8 is a ring counter which performs a count operation synchronously with the system clock CK, and starts counting synchronously when the logical sum signal S3 takes the logical level "L". A time interval $\tau_M$ from the restart time to when the maximum count M is counted up is set longer than the horizontal scan period (1 H period) which is in conformity with standard television systems such as NTSC and PAL. Namely, a product ($M \times \tau_{CK}$) of one period $\tau_{CK}$ of the system clock CK and the maximum count M is set longer than the horizontal scan period (1 H period).

Switch circuits 12, 14 and 16 are connected to the bit output terminals b0 to b10 of the binary counter 8. Outputs of the switch circuits 12, 14 and 16 are supplied to a NAND gate 13, an AND gate 15, and a NAND gate 17 to thereby constitute the first to third decoder circuits DC1 to DC3 connected in parallel.

Each of the first and second switch circuits 12 and 14 is constituted of a plurality of switching elements independently connected to the bit output terminals b0 to b10 of the binary counter 8. The decoded value can be controlled by switching each switching element.

Figure 2B:
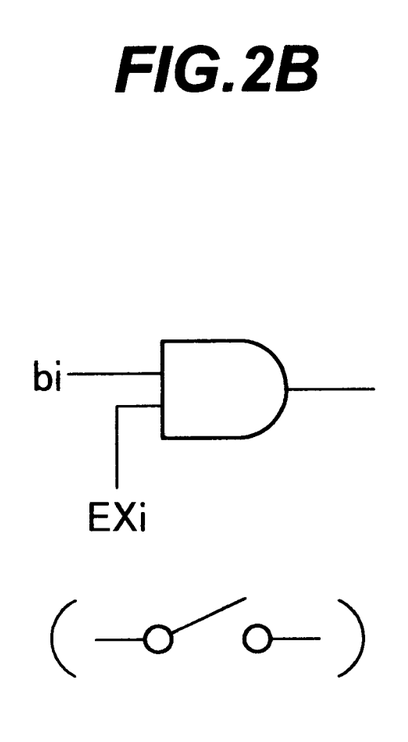

As shown in FIG. 2B, each switching element is constituted of an AND gate which is input with a bit output $b_i$ of the binary counter 8 and a switching signal $EX_i$. By independently setting the logical value of the switching signal $EX_i$, the decode value can be controlled. The switch circuit 16 does not contain switching elements and is not a switching circuit in a strict sense, but it has the function similar to the switch circuits 12 and 14 by changing an output signal from the NAND gate 17 in accordance with input signals of a predetermined pattern.

The decode value of each of the decoder circuits DC1 to DC3 is set by a corresponding one of the switch circuits 12, 14 and 16. When the bit output of the binary counter 8 takes a value NH (hereinafter called a rate value) corresponding to the horizontal scan period (1 H), the first decoder circuit DC1 outputs the rate signal S2, whereas the bit output takes another value NF (hereinafter called a front edge value), the second decoder circuit DC2 outputs a start signal ST, and whereas the bit output takes another value NB (hereinafter called a back edge value), the third decoder circuit DC 3 outputs a stop signal SP.

The rate value NH, front edge value NF and back edge value NB have a relation of NB<NF<NH. The back edge value NB is equal to a difference between the rate value NH and front edge value NF (NH−NF). Although the details will be later given, a period $T_{NF}$ shown in the timing chart of FIG. 4 corresponds to the front edge value NF, a period $T_{NB}$ corresponds to the back edge value NB, and a period $T_H$ equal to the horizontal scan period (1 H) corresponds to the rate value NH.

By adjusting the decode value of the decode circuits DC1 and DC2, the rate value NH and front end value NF can be adjusted so as to match different horizontal scan periods of NTSC and PAL.

The second signal generator circuit BL2 includes a DFF 18, inverters 19 and 20, and a NAND gate 21, and outputs a rectangular signal S7 whose logical value changes with the detection signal S1 and rate signal S2. Namely, the rectangular signal S7 to be output from a non-inverting output terminal of DFF 18 inverts to the logical level "L" synchronously when the rate signal S2 inverts to the logical level "L" while the detection signal S1 takes the logical level "H", and inverts to the logical level "H" synchronously when the detection signal S1 and rate signal S2 invert to the logical level "L".

The third signal generator circuit BL3 is constituted of a DFF 22, and generates a rectangular signal S8 whose logical level changes with the start signal ST and stop signal SP. Namely, the rectangular signal S8 to be output from an inverting output terminal of DFF 22 inverts to the logical level "L" synchronously at the rising edge of the start signal ST inverted to the logical level "H" while the stop signal SP takes the logical level "H", and inverts to the logical level "H" at the rising edge of the stop signal SP inverted to the logical level "L".

The rectangular signals S7 and S8 generated by the second and third signal generator circuits BL2 and BL3 are supplied to the window signal generator circuit 6.

Figure 3:
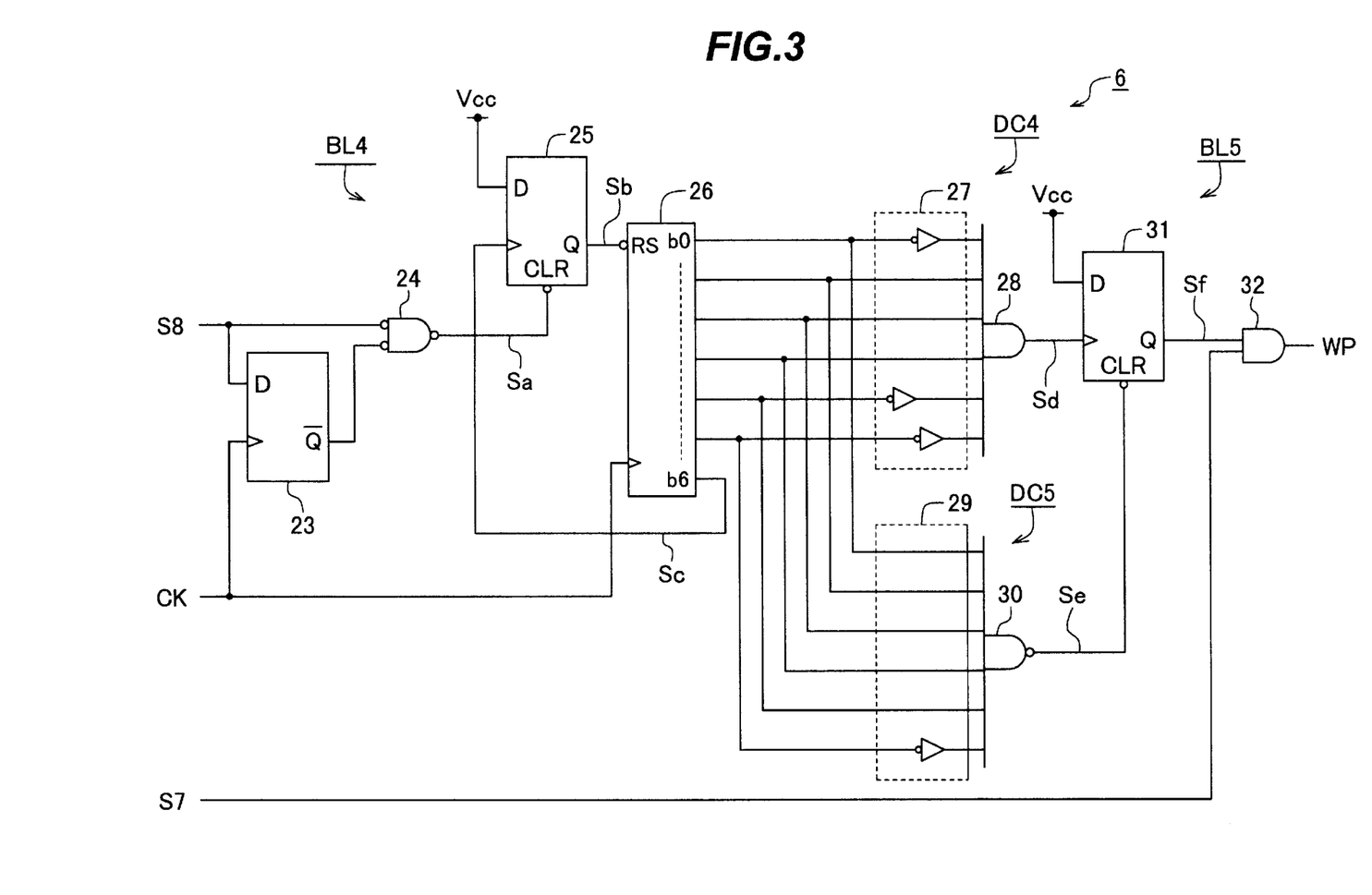
FIG. 3 is a circuit diagram showing the structure of a window signal generator in the circuit shown in FIG. 1.

The structure of the window signal generator circuit 6 will be detained with reference to FIG. 3.

The window signal generator circuit 6 includes fourth and fifth signal generator circuits BL4 and BL5, fourth and fifth decoder circuits DC4 and DC5 and a binary counter 26.

The fourth signal generator circuit BL4 is constituted of DFF's 23 and 25, an AND gate with a NOT gate at each input and output (hereinafter called an OR gate) 24. DFF 23 and OR gate 24 detect a falling edge of the rectangular signal S8 synchronously with the system clock CK, and generates a pulse signal Sa of a single pulse. DFF 25 generates a rectangular signal Sb whose logical value changes with the pulse signal Sa and a highest bit output signal Sc from the binary counter 26.

Namely, the rectangular signal Sb to be output from the non-inverting output terminal of DFF 25 inverts to the logical level "H" synchronously when the pulse signal Sa inverts from the logical level "H" to "L" while the bit output signal Sc takes the logical level "L", and inverts to the logical level "L" synchronously when the bit output signal Sc inverts to the logical level "H" while the pulse signal Sa takes the logical level "H".

The binary counter 26 is a ring counter which performs a count operation synchronously with the system clock CK, and starts counting synchronously when the rectangular signal Sc input to a reset start terminal RS takes the logical level "L".

Bit output terminals b0 to b6 of the binary counter 26 are connected, as shown, to the fourth and fifth decoder circuits DC4 and DC5, the decoder circuit DC4 being constituted of a switch circuit 27 and an AND gate and the decoder circuit DC5 being constituted of a switch circuit 29 and a NAND gate 30.

The decode values of both the decoder circuits DC4 and DC5 are set by the respective switch circuits 27 and 29. When the bit output of the binary counter 26 takes a predetermined value Nd, the fourth decoder circuit DC4 outputs a pulse signal Sd, and when it takes another predetermined value Ne, the fifth decoder circuit DC5 outputs a pulse signal Se.

Figure 4:
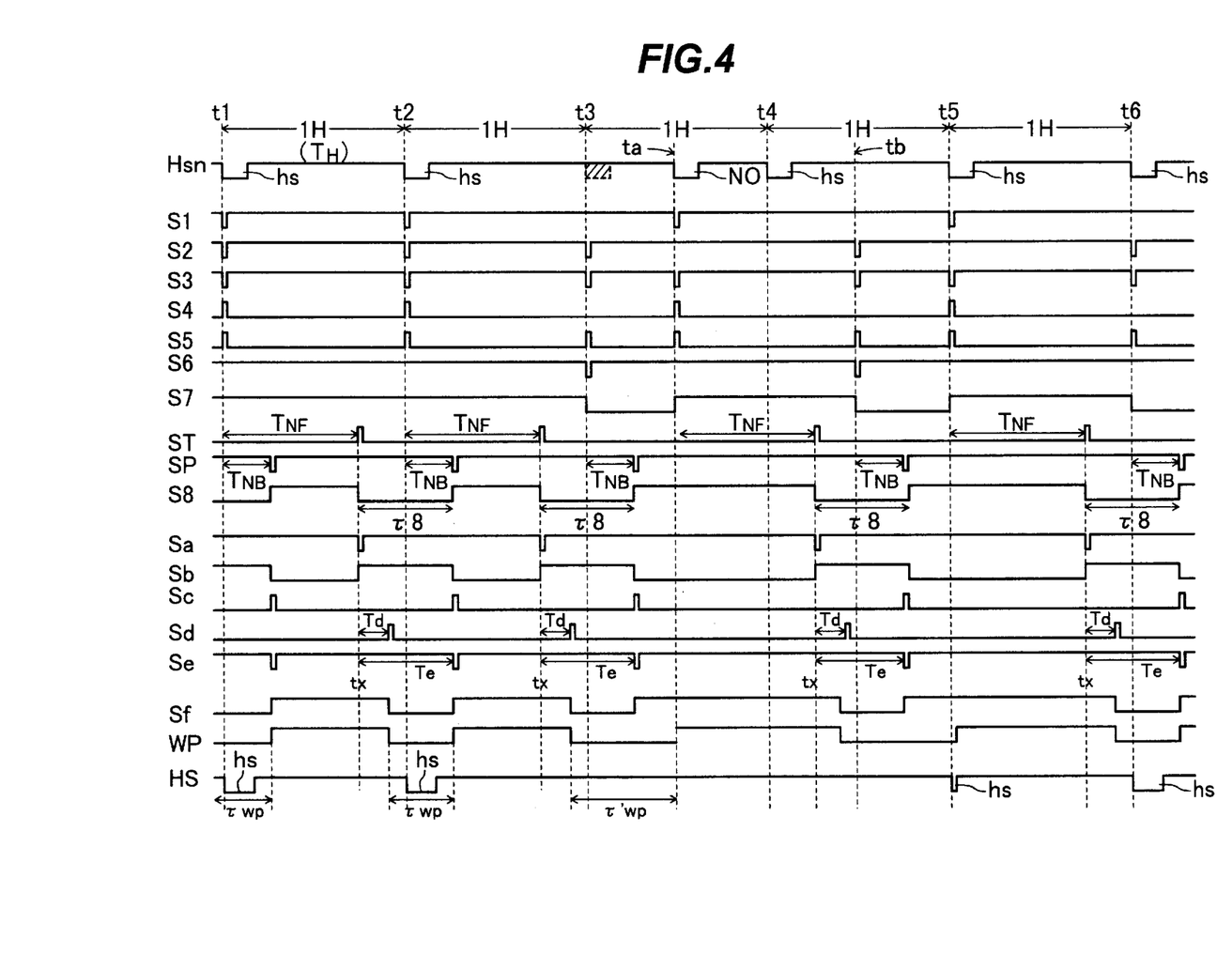
FIG. 4 is a timing chart showing an example of operations of the circuits shown in FIGS. 1 to 3.

A period Td shown in the timing chart of FIG. 4 corresponds to the predetermined value Nd, and a period Te corresponds to the predetermined value Ne.

The fifth signal generator circuit BL5 is constituted of a DFF 31 and an AND gate 32, generates the window signal WP whose logical level changes with the pulse signals Sd and Se and the rectangular signal S7, and supplies the window signal WP to the switch circuit 4.

A rectangular signal Sf whose logical level changes with the pulse signals Sd and Se is output from a non-inverting output terminal of DFF 31. This rectangular signal Sf inverts to the logical level "L" synchronously when the pulse signal Sd inverts to the logical level "H while the pulse signal Se takes the logical level "H, and inverts to the logical level "H" synchronously when the pulse signal Se inverts from the logical level "H" to "L" while the pulse signal Sd takes the logical level "L". The AND gate 32 executes an AND operation of the rectangular signals Sf and S7 to output the window signal WP.

An example of the operation of the horizontal synchronous signal detection circuit will be described with reference to the timing chart shown in FIG. 4. In FIG. 4, timings t1, t2, t3, t4, t5 and t6 are timings when a correct horizontal synchronous signal is to be generated (hereinafter called horizontal synchronous timing). In this example shown in FIG. 4, it is assumed that the correct horizontal synchronous pulse hs is detected through synchronous signal separation at the timings t1, t2, t4, t5 and t6, that the horizontal synchronous pulse is not detected at the timing t3, and that noises NO are entered at a timing ta. A failure in detecting a synchronous pulse occurs, for example, when the separated horizontal synchronous signal HSn output from the synchronous signal separation circuit 2 was influenced by waveform distortion of the video signal AV.

First, the operation from the timing t1 to the timing t3 will be described. If the separated horizontal signals HSn were already detected before the timing t1 from the video signal AV without waveform distortion, the window signal WP takes the logical value "L" during a predetermined time duration $\tau_{WP}$ before and after each of the timings t1 and t2. Therefore, during this time duration, the switch circuit 4 (OR gate 7) enters the conductive state relative to HSn, and supplies the separated horizontal synchronous signal HSn having the correct horizontal synchronous signal hs to the oscillator circuit 5.

Synchronously with the falling edge of this horizontal synchronous signal hs, the oscillator 5 generates the signals S1 to S8, ST and SP as shown in FIG. 2A, and synchronously with the rectangular signals S7 and S8, the window signal generator circuit 6 generates the window signal WP having the logical value "L" during the time duration $\tau_{WP}$ as shown in FIG. 3. The oscillator 5 and window signal generator circuit 6 cooperates therefore to output the horizontal synchronous signal HS having the correct horizontal synchronous signal hs.

As above, as the separated horizontal synchronous signal HSn not influenced by waveform distortion is supplied to the oscillator 5, the rectangular signal S7 is always maintained at the logical level "H" and the rectangular signal S8 inverts its logical level synchronously with the rising edge of the start signal ST and the falling edge of the stop signal SP. Therefore, the window signal WP takes the logical level "L" having the predetermined time duration $\tau_{WP}$ before and after the horizontal synchronous timings t1 and t2.

The window signal generator circuit 6 generates also the signals Sa to Sf synchronously with a change in the logical level of the rectangular signal S8. The pulse signal Sa is generated synchronously with the falling edge of the rectangular signal S8, and the rectangular signal Sb inverts to the logical level "H" synchronously with the generation of the pulse signal Sa, and signals Sd and Se of a single pulse are generated respectively after the predetermined periods Td and Te after the rectangular signal Sb inverts to the logical level "H".

The rectangular signal Sf is then generated whose logical level inverts synchronously with the pulse signals Sd and Se. A logical sum of this rectangular signal Sf and rectangular signal S7 generates the window signal WP taking the logical level "L" during the predetermined time duration $\tau_{WP}$ before and after the horizontal synchronous timings t1 and t2.

Next, an operation after the timing t3 when the separated horizontal synchronous signal HSn does not contain the horizontal synchronous signal hs, will be described.

In this case, the detection signal S1 in the oscillator 5 maintains the logical level "H" and its inverted signal S4 maintains the logical level "L". However, since the count operation of the binary counter 8 in the oscillator 5 continues, the rate signal S2 is output from the first decoder circuit DC1 when the bit output of the binary counter 8 reaches the rate value NH (i.e., at the timing t3). Further, since the logical sum signal S3 taking the logical level "L" synchronously with the generation of the rate signal S2 is fed back to the binary counter 8, the binary counter 8 restarts at the timing t3. When the bit output of the binary counter 8 reaches the back edge value NB, the third decoder circuit DC3 outputs the stop signal SP of a single pulse.

The detection signal S1 and rate signal S2 makes the single pulse signal S6 be output from the NAND gate 21. Synchronously with this pulse signal S6, the rectangular signal S7 to be supplied from the oscillator 5 to the window signal generator circuit 6 inverts to the logical level "L".

Therefore, if the separated horizontal synchronous signal HSn does not contain the horizontal synchronous pulse hs, although the rectangular signal S7 of the oscillator 5 takes the logical level "L", the signals Sa to Sf in the window signal generator circuit 6 take waveforms as if the correct horizontal synchronous pulse hs is detected.

The window signal WP, which is a logical product of the rectangular signal S7 and Sf, therefore takes the logical level "L" during a predetermined time duration $\tau'_{WP}$ before and after the timing t3. During this time duration $\tau'_{WP}$, the switch circuit 4 enters the conductive state. During this time duration $\tau'_{WP}$, the output horizontal synchronous signal HS does not contain the horizontal synchronous signal hs because it does not exist at the timing t3.

Next, an operation after the timing ta when noises No enter the separated horizontal synchronous signal HSn, will be described.

The noises NO are input to the switch circuit 4 and output therefrom if the window signal WP takes the logical level "L" during the time duration $\tau'_{WP}$. However, when the noises NO enter, the switch circuit 4 enters the non-conductive state as in the following manner. The signals S1 to S8, ST and SP are generated synchronously with the falling edge of the noises. The rectangular signal S7 inverts to the logical level "H". The binary counter 8 restarts at the timing ta synchronously with the logical sum signal S3.

As the binary counter 8 restarts at the timing ta, the start and stop signals ST and SP output from the second and third decoder circuits DC2 and DC3 maintain the logical levels "L" and "H" respectively while the noises NO are generated, and the rectangular signal S8 also maintains the logical level "H". Since the rectangular signals S7 and S8 both taking the logical level "H" are supplied to the window signal generator circuit 6, the rectangular signal Sf maintains the logical level "H".

As a result, the window signal WP, which is the logical product of the rectangular signals S7 and Sf, maintains the logical level "H" while the noises NO are generated to thus make the switch circuit 4 enter the off-state.

Next, an operation after the timing t4 when the separated horizontal synchronous signal HSn again contains the horizontal synchronous pulse hs, will be described.

In this case, the binary counter 8 restarted synchronously with the noises NO generated at the timing ta. Therefore, at the timing t4, the signals S1 to S8, ST and SP in the oscillator 5 and the signals Sa to Sf in the window signal generator circuit 6 are maintained to have the states after the restart of the binary counter 8. The window signal WP, which is the logical product of the rectangular signals S7 and Sf, therefore maintains the logical level "H" at the timing t4 to thus make the switch circuit 4 enter the off-state.

When the bit output of the binary counter 8 reaches the rate value NH at the timing tb, the rate signal S2 of a single pulse S2 is output from the first decoder circuit DC1 so that the window signal WP takes the logical level "L" before and after the timing tb, similar to the timing t3. Therefore, during the period while the window signal WP takes the logical level "L", the switch circuit 4 enters the conductive state. During this period, the output horizontal synchronous signal HS maintains the logical level "H" at the timing tb because it does not contain the horizontal synchronous pulse hs.

Next, an operation after the timing t5 when the separated horizontal synchronous signal HSn again contains the horizontal synchronous signal hs, will be described.

In this case, since the window signal WP maintains the logical level "L", the separated horizontal synchronous signal hs is input to and output from the switch circuit 4. Therefore, the horizontal synchronous signal HS contains the horizontal synchronous pulse hs at the timing t5. It means that the horizontal synchronous signal HS is detected synchronously with the correct horizontal synchronous timing.

After the horizontal synchronous signal HS is detected at the correct horizontal synchronous timing, the operation similar to that at the timings t1 and t2 is executed each time the separated horizontal synchronous signal HSn not influenced by waveform distortion is detected. The horizontal synchronous signal HS can therefore be detected reliably.

As described so far, in this embodiment, the oscillator 4 generates the rate signal S2 having a period equal to the horizontal scan period, synchronously with a change in the signal output from the switch circuit 4, and the time duration of the conductive period while the window signal WP takes the logical level "L" is adjusted synchronously with the generation timing of the rate signal S2 so as to make the change timing of the horizontal synchronous signal HS coincide with the generation timing of the rate signal S2. Accordingly, even if the separated horizontal synchronous signal HSn has a fluctuation in its waveform caused by the waveform distortion of the video signal AV, the conductive period of the window signal WP synchronizes with the generation timing of the horizontal synchronous signal hs after the end of waveform fluctuation. A horizontal synchronous signal detection circuit can be realized which has a tracking performance better than a conventional digital PLL circuit.

A conventional horizontal synchronous detection circuit having a digital PLL circuit cannot detect a horizontal synchronous signal contained in a video signal. The horizontal synchronous signal detection circuit of this embodiment can detect a horizontal synchronous signal contained in a video signal because this circuit is excellent in the tracking performance. Even if the horizontal synchronous signal in a video signal has waveform distortion, the horizontal synchronous signal can be detected during the next horizontal scan period. It is therefore possible to solve the problem of disturbance of a reproduced image, a partial loss of the image and the like which are associated with a conventional digital PLL circuit.

The timing chart shown in FIG. 4 illustrates only a typical example of the operation of the embodiment circuit. Even from the separated horizontal synchronous signal HSn influenced by other types of waveform distortion, the horizontal synchronous signal detection circuit of the embodiment can reliably generate the horizontal synchronous signal HS. Also the circuit structures shown in FIGS. 2A, 2B and 3 may be replaced by other circuit structures having similar functions. Further, correction of synchronous signal other than the horizontal synchronous signal can be done in a similar way.

The present invention has been described in connection with the preferred embodiments. The invention is not limited only to the above embodiments. It is apparent that various modifications, improvements, combinations, and the like can be made by those skilled in the art.

What is claimed is:

1. A synchronous signal detection circuit comprising:
    a synchronous signal separation circuit for separating a synchronous signal from a video signal;
    a circuit for generating a window signal in accordance with the separated synchronous signal, the window signal designating a period during which following synchronous signals are anticipated; and
    a gate for passing the synchronous signal only during the period designated by the window signal,
    wherein said window signal generating circuit includes a counter which is reset by the synchronous signal passed through said gate.

2. A synchronous signal detection circuit according to claim 1, wherein said counter counts a clock signal having a predetermined period.

3. A synchronous signal detection circuit according to claim 2, wherein said window signal generating circuit includes a plurality of decoders each decoding an output of said counter.

4. A synchronous signal detection circuit according to claim 3, wherein one of said plurality of decoders generates an 1 H signal for designating a period corresponding to a horizontal scan period.

5. A synchronous signal detection circuit according to claim 4, wherein said counter is reset in accordance with the 1 H signal.

6. The circuit of claim 4, wherein the 1 H signal marks a beginning point and an end point corresponding to the horizontal scan period.

7. The circuit of claim 6, wherein the counter is reset according to the 1 H signal.

8. A synchronous signal detection circuit according to claim 3, wherein at least one of said plurality of decoders comprises a switching element.

9. A synchronous signal detection circuit according to claim 8, wherein at least one of said plurality of decoders does not comprise a switching clement.

10. A synchronous signal detection circuit according to claim 3, wherein said plurality of decoders generate different signal values.

11. A synchronous signal detection circuit according to claim 3, wherein the decode values of said plurality of decoders is adjusted so that a rate value and a front end value of a synchronous signal can be adjusted to match different horizontal scan periods.

12. A synchronous signal detection circuit according to claim 3, wherein said plurality of decoders include a decoder for generating a window period designating output for designating a front edge and a back edge of the period during which following synchronous signals are anticipated.

13. A synchronous signal detection circuit according to claim 12, wherein one of said plurality of decoders generates an 1 H signal for designating a period corresponding to a horizontal scan period.

14. A synchronous signal detection circuit according to claim 13, wherein said counter is reset in accordance with the 1 H signal.

15. A synchronous signal detection circuit according to claim 14, wherein the synchronous signal separated by said synchronous signal separation circuit is a horizontal synchronous signal.

16. A synchronous signal detection circuit comprising:
    a synchronous signal separation circuit for separating a synchronous signal from a video signal;
    a circuit for generating a window signal in accordance with the separated synchronous signal, the window signal designating a period during which following synchronous signals are anticipated;
    a gate for passing the synchronous signal only during the period designated by the window signal; and
    an oscillator for adjusting a time duration of an open period and a closed period of the window signal,
    wherein the oscillator comprises a plurality of decoders which are adjustably set to adjust the open and closed periods of the window signal, wherein the gate passes the separated synchronous signal during the open period of the window signal the gate further intercepts the separated synchronous signal during the closed period of the window signal.

17. The synchronous signal detection circuit according to claim 16, wherein said oscillator comprises:
    a counter, and
    a plurality of generator circuits which comprise a plurality of D-type flip flops.

18. A synchronous signal detection circuit comprising:
    a synchronous signal separation circuit for separating a synchronous signal from a video signal;
    a circuit for generating a window signal in accordance with the separated synchronous signal, the window signal designating a period during which following synchronous signals are anticipated; and a gate for passing the synchronous signal only during the period designated by the window signal, wherein said synchronous signal detection circuit masks incorrect synchronous signals, wherein said window signal generator circuit takes a waveform emulating the detection of a correct horizontal synchronous pulse.

19. A synchronous signal detection circuit comprising:

a synchronous signal separation circuit for separating a synchronous signal from a video signal;

a circuit for generating a window signal in accordance with the separated synchronous signal, the window signal designating a period during which following synchronous signals are anticipated; and a gate for passing the synchronous signal only during the period designated by the window signal, wherein said gate receives the separated horizontal synchronous signal, wherein said separated horizontal synchronous signal is produced by said synchronous signal separation circuit.

20. A synchronous signal detection circuit according to claim 19, wherein said gate receives a window signal from said window signal generating circuit.

21. A synchronous signal detection circuit comprising:

a synchronous signal separation circuit for separating a synchronous signal from a video signal;

a circuit for generating a window signal in accordance with the separated synchronous signal, the window signal designating a period during which following synchronous signals are anticipated;

a gate for passing the synchronous signal only during the period designated by the window signal; and an oscillator for adjusting a time duration of an open period and a closed period of the window signal, wherein said separated horizontal synchronous signal having a correct horizontal synchronous signal passed by said gate, is supplied to said oscillator.

22. The synchronous signal detection circuit according to claim 21, wherein said oscillator comprises:

a counter, and a plurality of generator circuits which comprise a plurality of D-type flip flops.

* * * * *